United States Patent
Li et al.

(10) Patent No.: US 10,819,584 B2
(45) Date of Patent: Oct. 27, 2020

(54) SYSTEM AND METHOD FOR PERFORMING ACTIONS BASED ON FUTURE PREDICTED METRIC VALUES GENERATED FROM TIME-SERIES DATA

(71) Applicant: ServiceNow, Inc., Santa Clara, CA (US)

(72) Inventors: Shoujing Li, Redmond, WA (US); Peng Wang, Bellevue, WA (US)

(73) Assignee: ServiceNow, Inc., Santa Clara, CA (US)

( * ) Notice: Subject to any disclaimer, the term of this patent is extended or adjusted under 35 U.S.C. 154(b) by 209 days.

(21) Appl. No.: 15/970,628

(22) Filed: May 3, 2018

(65) Prior Publication Data
US 2019/0342181 A1    Nov. 7, 2019

(51) Int. Cl.
| | | |
|---|---|---|
| H04L 12/24 | (2006.01) | |
| H04L 12/26 | (2006.01) | |
| G06F 17/18 | (2006.01) | |
| G06N 5/04 | (2006.01) | |

(52) U.S. Cl.
CPC ............ *H04L 41/147* (2013.01); *G06F 17/18* (2013.01); *G06N 5/04* (2013.01); *H04L 41/142* (2013.01); *H04L 41/145* (2013.01); *H04L 43/08* (2013.01); *H04L 43/16* (2013.01)

(58) Field of Classification Search
CPC ... H04L 41/147; H04L 41/145; H04L 41/142; H04L 43/16; H04L 43/08; H04L 41/22; H04L 43/0876; H04L 41/0803; G06N 5/04; G06F 17/18
See application file for complete search history.

(56) References Cited

U.S. PATENT DOCUMENTS

| | | | |
|---|---|---|---|
| 6,321,229 B1 | 11/2001 | Goldman | |
| 6,446,123 B1* | 9/2002 | Ballantine | ............... H04L 41/06 709/224 |
| 6,526,397 B2* | 2/2003 | Chee | ...................... G06Q 10/06 |
| 6,718,384 B2* | 4/2004 | Linzy | .................. H04L 41/0213 709/220 |
| 6,816,898 B1 | 11/2004 | Scarpelli | |
| 7,114,183 B1* | 9/2006 | Joiner | ................... H04L 43/045 713/188 |
| 7,136,788 B2* | 11/2006 | Tupper | .................. G06Q 50/22 703/2 |
| 7,171,340 B2* | 1/2007 | Brocklebank | ........... G06F 30/20 702/189 |
| 7,350,209 B2 | 3/2008 | Shum | |
| 7,444,263 B2* | 10/2008 | White | ................. G06F 11/3409 700/51 |

(Continued)

OTHER PUBLICATIONS

Li, Lei, et al.; "Rolling Window Time Series Prediction Using MapReduce"; Semantic Scholar, 2014, 8 pages.

(Continued)

*Primary Examiner* — Daniel C. Murray
(74) *Attorney, Agent, or Firm* — Fletcher Yoder PC (57) ABSTRACT

The present approach relates to techniques for efficiently monitoring time-series data for a metric of interest using limited subsets of the time-series data and, based on the modeling, to generate predictions for the metric. Based on the predictions for the metric, one or more actions may be configured to be taken when the predicted value for the metric is outside of a specified range or exceeds a specified threshold.

20 Claims, 6 Drawing Sheets

(56) References Cited

U.S. PATENT DOCUMENTS

| | | | |
|---|---|---|---|
| 7,580,813 B2 | 8/2009 | Thiesson et al. | |
| 7,643,969 B2* | 1/2010 | Soto | G16H 50/20 |
| | | | 703/2 |
| 7,818,196 B2* | 10/2010 | Olson | G06Q 10/06 |
| | | | 705/7.15 |
| 7,890,802 B2 | 2/2011 | Gerber | |
| 8,151,261 B2 | 4/2012 | Sirota | |
| 8,347,148 B1* | 1/2013 | Harrison | G06F 16/21 |
| | | | 714/47.2 |
| 8,646,093 B2 | 2/2014 | Myers | |
| 8,984,337 B2* | 3/2015 | Sonoda | G06F 11/0709 |
| | | | 714/26 |
| 9,373,078 B1* | 6/2016 | Olsson | G06F 16/24565 |
| 9,819,729 B2 | 11/2017 | Moon | |
| 9,842,039 B2* | 12/2017 | Siciliano | H04L 47/762 |
| 10,225,155 B2* | 3/2019 | Manning | H04L 43/08 |
| 10,462,004 B2* | 10/2019 | Hsiao | H04L 67/12 |
| 10,523,521 B2* | 12/2019 | Hsiao | H04L 43/022 |
| 10,599,449 B1* | 3/2020 | Chatzipanagiotis | G06N 3/04 |
| 2006/0200549 A1* | 9/2006 | Soto | G06Q 50/22 |
| | | | 709/224 |
| 2006/0282301 A1 | 12/2006 | Olson | |
| 2008/0065687 A1* | 3/2008 | Coulter, Jr. | G06F 11/261 |
| 2009/0028056 A1* | 1/2009 | Rahman | H04L 41/064 |
| | | | 370/242 |
| 2009/0276761 A1* | 11/2009 | Saeed | G06F 11/3419 |
| | | | 717/127 |
| 2011/0022586 A1* | 1/2011 | Wilkinson | G06F 16/217 |
| | | | 707/720 |
| 2012/0005533 A1* | 1/2012 | Li | G06F 11/008 |
| | | | 714/26 |
| 2012/0054331 A1* | 3/2012 | Dagan | H04L 43/0817 |
| | | | 709/224 |
| 2013/0339515 A1* | 12/2013 | Radhakrishnan | H04L 41/142 |
| | | | 709/224 |
| 2014/0108640 A1* | 4/2014 | Mathis | H04L 41/145 |
| | | | 709/224 |
| 2014/0307927 A1* | 10/2014 | Folmer | A61B 5/7267 |
| | | | 382/107 |
| 2015/0082432 A1* | 3/2015 | Eaton | H04L 47/785 |
| | | | 726/23 |
| 2015/0295780 A1* | 10/2015 | Hsiao | H04L 43/022 |
| | | | 715/736 |
| 2015/0341212 A1* | 11/2015 | Hsiao | G06F 3/0482 |
| | | | 715/735 |
| 2016/0062950 A1* | 3/2016 | Brodersen | G06K 9/00 |
| | | | 702/181 |
| 2016/0080216 A1* | 3/2016 | Yu | H04L 41/142 |
| | | | 370/250 |
| 2016/0091397 A1* | 3/2016 | Shinkle | G05B 23/0232 |
| | | | 702/35 |
| 2016/0094401 A1* | 3/2016 | Anwar | G06F 11/3006 |
| | | | 709/223 |
| 2016/0217022 A1* | 7/2016 | Velipasaoglu | G06F 11/079 |
| 2016/0277953 A1* | 9/2016 | Andersson | H04L 41/5003 |
| 2016/0350674 A1* | 12/2016 | Midboe | H04L 67/22 |
| 2017/0006135 A1* | 1/2017 | Siebel | G06F 9/5072 |
| 2017/0155537 A1* | 6/2017 | Maheshwari | H04L 41/064 |
| 2017/0161409 A1* | 6/2017 | Martin | G06F 30/20 |
| 2018/0025279 A1* | 1/2018 | Bose | G06N 20/00 |
| | | | 706/12 |
| 2018/0089278 A1* | 3/2018 | Bhattacharjee | H04L 43/08 |
| 2018/0219879 A1* | 8/2018 | Pierce | H04L 63/1416 |
| 2018/0307712 A1* | 10/2018 | Baradaran | H04L 41/142 |
| 2018/0324030 A1* | 11/2018 | Dang | H04L 43/0817 |
| 2018/0324199 A1* | 11/2018 | Crotinger | G06F 17/18 |
| 2019/0095265 A1* | 3/2019 | Dome | H04L 41/069 |
| 2019/0102276 A1* | 4/2019 | Dang | H04L 67/1097 |
| 2019/0235484 A1* | 8/2019 | Ristovski | G05B 23/0283 |
| 2019/0334802 A1* | 10/2019 | Dutta | H04L 41/0866 |
| 2019/0349273 A1* | 11/2019 | Rikovic Tabak | H04L 43/045 |
| 2020/0065213 A1* | 2/2020 | Poghosyan | G06F 11/3065 |
| 2020/0092159 A1* | 3/2020 | Thampy | H04B 17/23 |
| 2020/0136923 A1* | 4/2020 | Altshuler | H04L 41/12 |

OTHER PUBLICATIONS

Perera, Srinath; "Rolling Window Regression: a Simple Approach for Time Series Next Value Predictions", 2016 https://medium.com/making-sense-of-data/time-series-next-value-prediction-using-regression-over-a-rolling-window-228f0acae363, 10 pages.

Vaysburd, Alex; "Real-time forecasts in the cloud: from market feed capture to ML predictions", https://cloud.google.com/blog/products/gcp/real-time-forecasts-in-the-cloud-from-market-feed-capture-to-ml-predictions, 2017, 15 pages.

\* cited by examiner

SYSTEM AND METHOD FOR PERFORMING ACTIONS BASED ON FUTURE PREDICTED METRIC VALUES GENERATED FROM TIME-SERIES DATA

BACKGROUND

The present disclosure relates generally to the analysis of time-series data.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Certain of these resources may be used to collect and store data related to a variety of measurable properties, including network, hardware, or database performance properties measured at different times. As systems for collecting data become more readily available and the costs for storage hardware continue to decrease, the amount of data that these computer resources are capable of collecting increases.

Although the capabilities of computer resources for collecting and storing more data continues to expand, the vast amount of collected data may prove to be difficult to interpret and synthesize. That is, the ability to meaningfully analyze the collected data has not necessarily increased in correspondence to the ability to gather and store such data. Thus, as the amounts of acquired and saved data increase, the ability to derive value from the data may remain limited.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

As discussed herein, approaches for generating estimates or predictions for a metric of interest from time-series data for the metric are provided. In accordance with certain aspects, the predictions for the metric are generated based on a limited subset of the available time-series data, such as a rolling window of time-series data for the metric in which old observations are removed from the analyzed data set as new (i.e., more recent) observations are added such that the size of the analyzed data set remains limited. Analysis of the data set may be based on a suitable statistical predictive modeling technique, such as a regression technique, including linear regression techniques or linear models. In one implementation, the analysis is performed on a rolling window of time-series data such that a new prediction for the metric is generated in substantially real-time and in a continuous manner as the rolling window updates.

In addition, a user may configure one or more actions to occur based on threshold values for the predicted values of the metric being modeled. In this manner, when a predicted value of the metric meets or breaches the specified threshold value, the configured action(s) is performed. In one implementation, a user can configure the model, the thresholds and the actions to be performed.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code. As used herein, the term "time-series" or "time-series data" refers to the values of a variable recorded at intervals, typically regular intervals, over a period of time. Examples of such time-series data as used herein may include, but are not limited to, values monitored and recorded for an operational parameter of a computing system, database, or network, such as a disk utilization, processor utilization, record locks, network bandwidth, open threads, and so forth.

Aspects of the present approach relate to generating predictions (or other estimations) for a metric of interest using time-series data related to the metric. The prediction for the metric may be for some defined time in the future (e.g., 1 minute, 1 hour, 12 hours, 1 day, 1 week, and so forth) and may be calculated using a linear model (e.g., a linear regression) fitted to a time-series of observations of the metric. To maintain a limited sample of points used to fit the model and generate the prediction, a rolling window approach is employed to remove older data observations as newer observations are added to the sample. Such a rolling window, as used herein, may be based on a set number of most recent observations (e.g., the most recent 10, 20, 100, 1,000, 10,000 observations, and so forth), observations obtained over a set time frame (e.g., the most recent observations acquired over the last 10 minutes, 30 minutes, 1 hour, 12 hours, 3 days, 1 week, 2 week, 1 month, and so forth), or any other suitable updated data set implementation by which a limited number of observations is updated over time so as to incorporate newer observations and discard older observations.

In one implementation, a linear regression model is employed to analyze the current window of measurements or observations for the metric of interest and to generate a prediction for the metric based on the current window of observations and the fit to linear regression model. Though a linear regression model is used herein as an example to facilitate explanation, it should be appreciated other suitable predictive models, linear or otherwise, may also be employed. In the manner discussed herein, predictions are generated in substantially real-time and in a continuous manner as the model is re-fitted or tuned in response to the rolling window being updated. Further, a user may configure one or more actions to occur based on threshold values for comparison to the predicted value of the metric.

Figure 1:
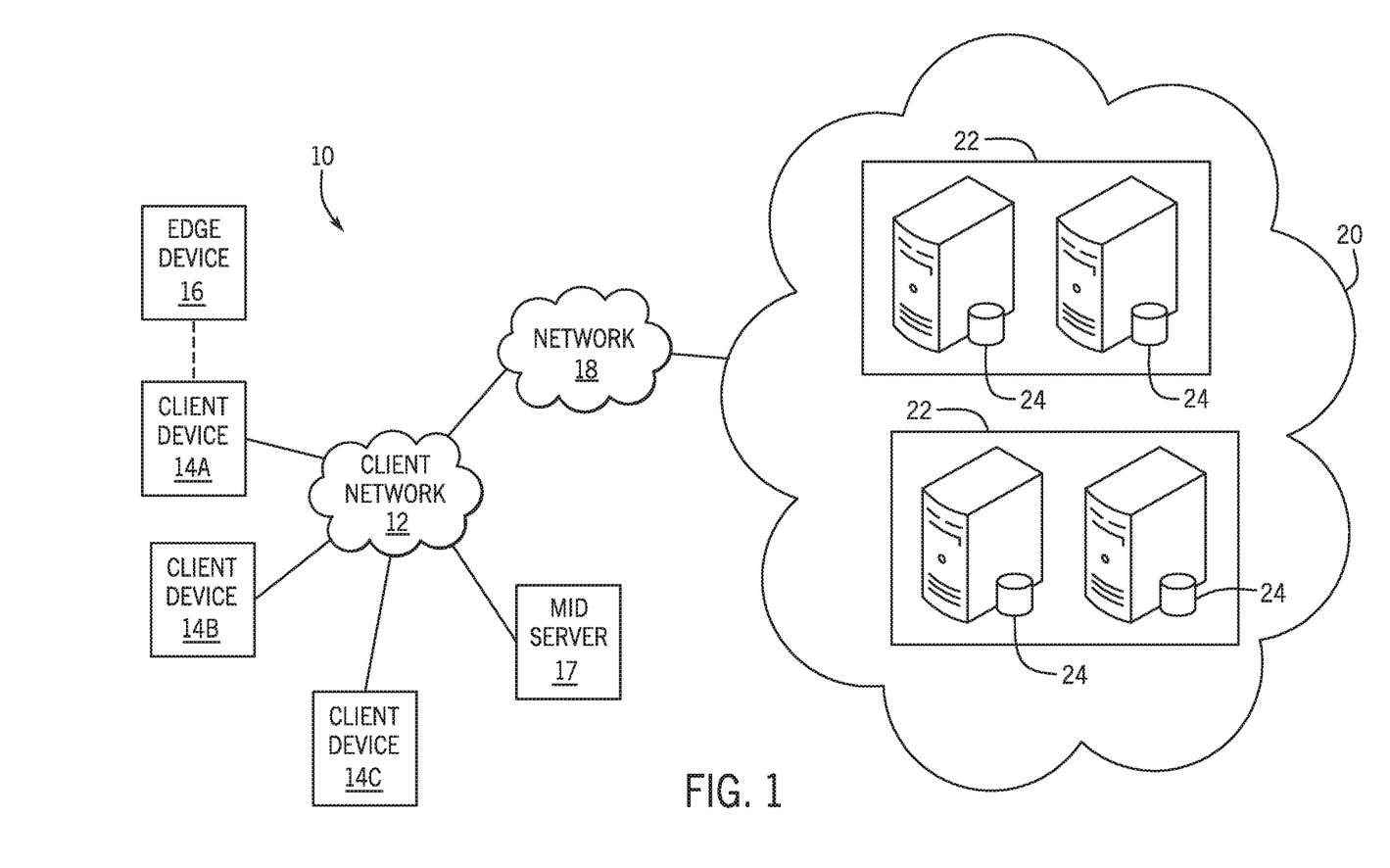
FIG. 1 is a block diagram of an embodiment of a cloud computing system in which embodiments of the present disclosure may operate.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a computing system 10, such as a cloud computing system, where embodiments of the present disclosure may operate, is illustrated. Computing system 10 may include a client network 12, network 18 (e.g., the Internet), and a cloud-based platform 20. In some implementations, the cloud-based platform may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 22, and/or other remote networks. As shown in FIG. 1, the client network 12 is able to connect to one or more client devices 14A, 14B, and 14C so that the client devices are able to communicate with each other and/or with the network hosting the platform 20. The client devices 14A-C may be computing systems and/or other types of computing devices generally referred to as Internet of Things (IoT) devices that access cloud computing services, for example, via a web browser application or via an edge device 16 that may act as a gateway between the client devices and the platform 20. FIG. 1 also illustrates that the client network 12 includes an administration or managerial device or server, such as a management, instrumentation, and discovery (MID) server 17 that facilitates communication of data between the network hosting the platform 20, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 18. The network 18 may include one or more computing networks, such as other LANs, wide area networks (WAN), the Internet, and/or other remote networks, to transfer data between the client devices 14A-C and the network hosting the platform 20. Each of the computing networks within network 18 may contain wired and/or wireless programmable devices that operate in the electrical and/or optical domain. For example, network 18 may include wireless networks, such as cellular networks (e.g., Global System for Mobile Communications (GSM) based cellular network), IEEE 802.11 networks, and/or other suitable radio-based networks. The network 18 may also employ any number of network communication protocols, such as Transmission Control Protocol (TCP) and Internet Protocol (IP). Although not explicitly shown in FIG. 1, network 18 may include a variety of network devices, such as servers, routers, network switches, and/or other network hardware devices configured to transport data over the network 18.

In FIG. 1, the network hosting the platform 20 may be a remote network (e.g., a cloud network) that is able to communicate with the client devices 14A-C via the client network 12 and network 18. The network hosting the platform 20 provides additional computing resources to the client devices 14A-C and/or client network 12. For example, by utilizing the network hosting the platform 20, users of client devices 14A-C are able to build and execute applications for various enterprise, IT, and/or other organization-related functions. In one embodiment, the network hosting the platform 20 is implemented on one or more data centers 22, where each data center could correspond to a different geographic location. Each of the data centers 22 includes a plurality of virtual servers 24 (also referred to herein as application nodes, application servers, virtual server instances, application instances, or application server instances), where each virtual server can be implemented on a physical computing system, such as a single electronic computing device (e.g., a single physical hardware server) or across multiple-computing devices (e.g., multiple physical hardware servers). Examples of virtual servers 24 include, but are not limited to a web server (e.g., a unitary web server installation), an application server (e.g., unitary JAVA Virtual Machine), and/or a database server, e.g., a unitary relational database management system (RDBMS) catalog.

To utilize computing resources within the platform 20, network operators may choose to configure the data centers 22 using a variety of computing infrastructures. In one embodiment, one or more of the data centers 22 are configured using a multi-tenant cloud architecture, such that one of the server instances 24 handles requests from and serves multiple customers. Data centers with multi-tenant cloud architecture commingle and store data from multiple customers, where multiple customer instances are assigned to one of the virtual servers 24. In a multi-tenant cloud architecture, the particular virtual server 24 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 24 causing outages for all customers allocated to the particular server instance.

In another embodiment, one or more of the data centers 22 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server and/or other combinations of physical and/or virtual servers 24, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 20, and customer-driven upgrade schedules. An example of implementing a customer instance within a multi-instance cloud architecture will be discussed in more detail below with reference to FIG. 2.

Figure 2:
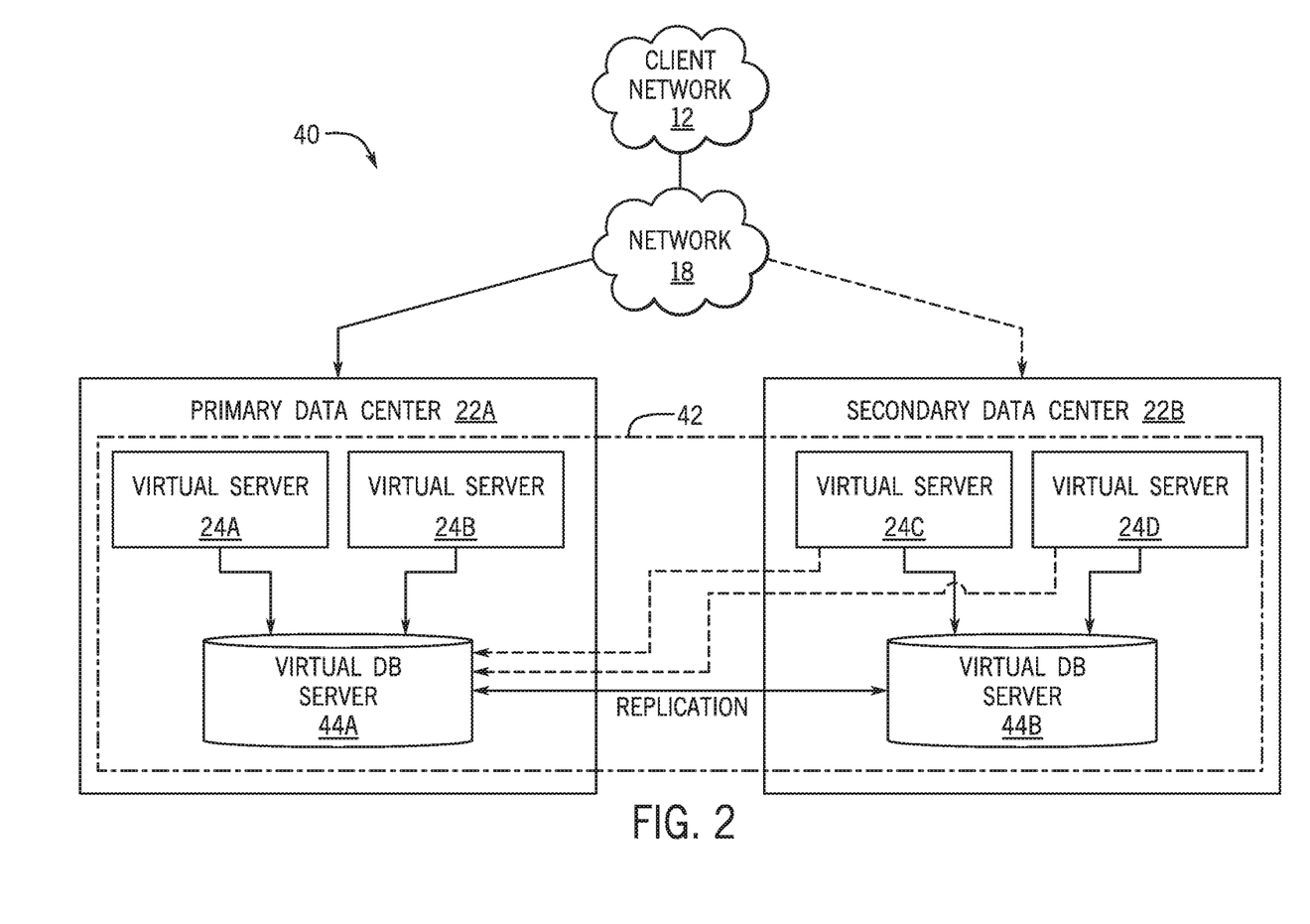
FIG. 2 is a block diagram of an embodiment of a multi-instance cloud architecture in which embodiments of the present disclosure may operate.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 18 that connect to two (e.g., paired) data centers 22A and 22B that may be geographically separated from one another. Using FIG. 2 as an example, network environment and service provider cloud infrastructure client instance 42 (also referred to herein as a simply client instance 42) is associated with (e.g., supported and enabled by) dedicated virtual servers (e.g., virtual servers 24A, 24B, 24C, and 24D) and dedicated database servers (e.g., virtual database servers 44A and 44B). Stated another way, the virtual servers 24A-24D and virtual database servers 44A and 44B are not shared with other client instances and are specific to the respective client instance 42. Other embodiments of the multi-instance cloud architecture 40 could include other types of dedicated virtual servers, such as a web server. For example, the client instance 42 could be associated with (e.g., supported and enabled by) the dedicated virtual servers 24A-24D, dedicated virtual database servers 44A and 44B, and additional dedicated virtual web servers (not shown in FIG. 2).

In the depicted example, to facilitate availability of the client instance 42, the virtual servers 24A-24D and virtual database servers 44A and 44B are allocated to two different data centers 22A and 22B, where one of the data centers 22 acts as a backup data center. In reference to FIG. 2, data center 22A acts as a primary data center that includes a primary pair of virtual servers 24A and 24B and the primary virtual database server 44A associated with the client instance 42. Data center 22B acts as a secondary data center 22B to back up the primary data center 22A for the client instance 42. To back up the primary data center 22A for the client instance 42, the secondary data center 22B includes a secondary pair of virtual servers 24C and 24D and a secondary virtual database server 44B. The primary virtual database server 44A is able to replicate data to the secondary virtual database server 44B (e.g., via the network 18).

As shown in FIG. 2, the primary virtual database server 44A may back up data to the secondary virtual database server 44B using a database replication operation. The replication of data between data could be implemented by performing full backups weekly and daily incremental backups in both data centers 22A and 22B. Having both a primary data center 22A and secondary data center 22B allows data traffic that typically travels to the primary data center 22A for the client instance 42 to be diverted to the second data center 22B during a failure and/or maintenance scenario. Using FIG. 2 as an example, if the virtual servers 24A and 24B and/or primary virtual database server 44A fails and/or is under maintenance, data traffic for client instances 42 can be diverted to the secondary virtual servers 24C and/or 24D and the secondary virtual database server instance 44B for processing.

Although FIGS. 1 and 2 illustrate specific embodiments of a cloud computing system 10 and a multi-instance cloud architecture 40, respectively, the disclosure is not limited to the specific embodiments illustrated in FIGS. 1 and 2. For instance, although FIG. 1 illustrates that the platform 20 is implemented using data centers, other embodiments of the platform 20 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 24A-D and virtual database servers 44A and 44B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
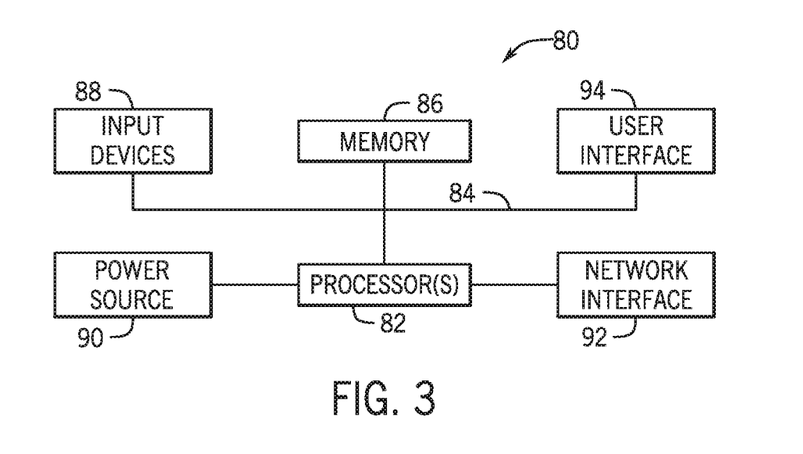
FIG. 3 is a block diagram of a computing device utilized in a computing system that may be present in FIG. 1 or 2, in accordance with aspects of the present disclosure.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 80 and their potential interconnections or communication paths, such as along one or more busses. As illustrated, the computing system 80 may include various hardware components such as, but not limited to, one or more processors 82, one or more busses 84, memory 86, input devices 88, a power source 90, a network interface 92, a user interface 94, and/or other computer components useful in performing the functions described herein.

The one or more processors 82 may include one or more microprocessors capable of performing instructions stored in the memory 86. Additionally or alternatively, the one or more processors 82 may include application-specific integrated circuits (ASICs), field-programmable gate arrays (FPGAs), and/or other devices designed to perform some or all of the functions discussed herein without calling instructions from the memory 86.

With respect to other components, the one or more busses 84 includes suitable electrical channels to provide data and/or power between the various components of the computing system 80. The memory 86 may include any tangible, non-transitory, and computer-readable storage media. Although shown as a single block in FIG. 1, the memory 86 can be implemented using multiple physical units of the same or different types in one or more physical locations. The input devices 88 correspond to structures to input data and/or commands to the one or more processor 82. For example, the input devices 88 may include a mouse, touchpad, touchscreen, keyboard and the like. The power source 90 can be any suitable source for power of the various components of the computing device 80, such as line power and/or a battery source. The network interface 92 includes one or more transceivers capable of communicating with other devices over one or more networks (e.g., a communication channel). The network interface 92 may provide a wired network interface or a wireless network interface. A user interface 94 may include a display that is configured to display text or images transferred to it from the one or more processors 82. In addition and/or alternative to the display, the user interface 94 may include other devices for interfacing with a user, such as lights (e.g., LEDs), speakers, and the like.

Figure 4:
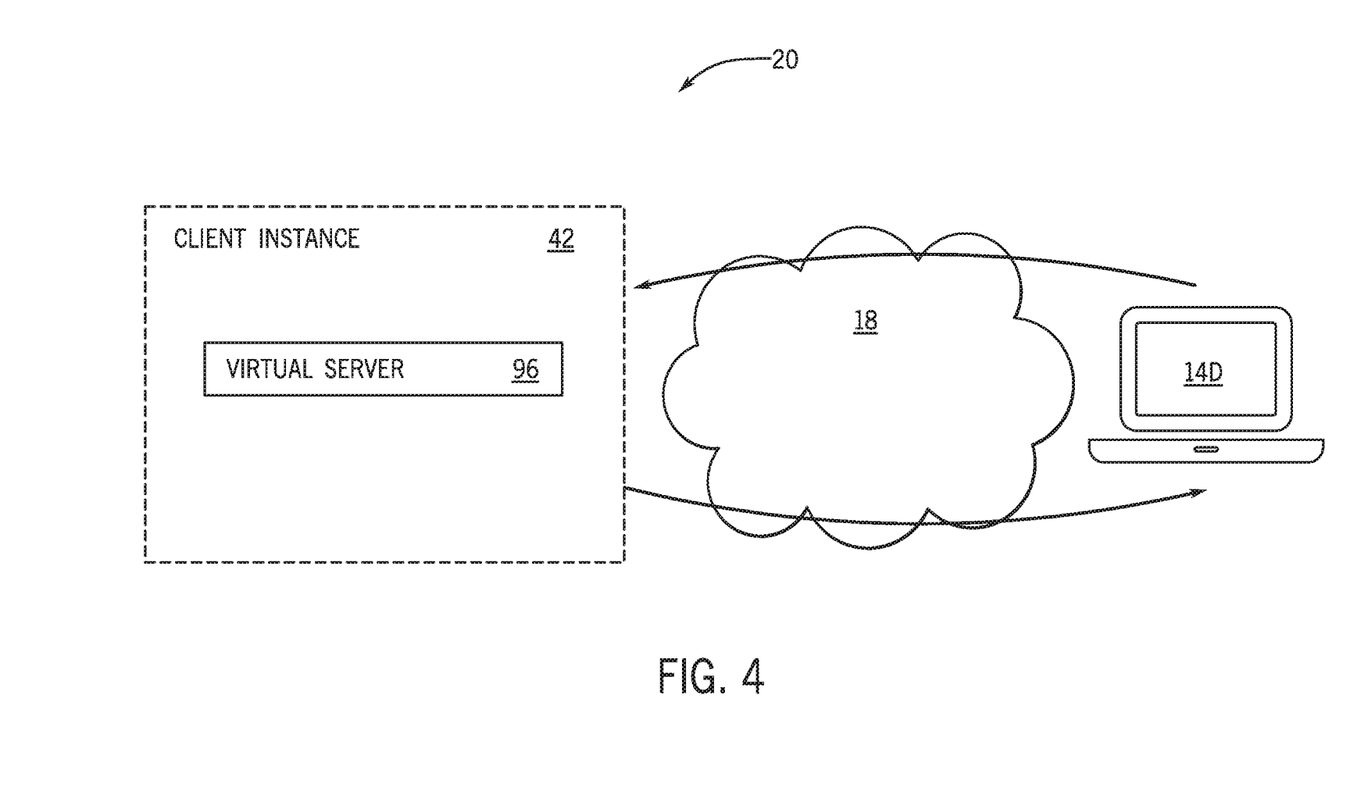
FIG. 4 is a block diagram illustrating an embodiment in which a virtual server supports and enables the client instance, in accordance with aspects of the present disclosure

As mentioned above, present embodiments are directed toward generating predictions (or other estimations) for a metric of interest using time-series data corresponding to the metric of interest. With the preceding in mind, FIG. 4 is a block diagram illustrating an embodiment in which a virtual server 96 supports and enables the client instance 42, according to one or more disclosed embodiments. More specifically, FIG. 4 illustrates an example of a portion of a service provider cloud infrastructure, including the cloud-based platform 20 discussed above. The cloud-based platform 20 is connected to a client device 14D via the network 18 to provide a user interface to network applications executing within the client instance 42 (e.g., via a web browser of the client device 14D). Client instance 42 is supported by virtual servers similar to those explained with respect to FIG. 2, and is illustrated here to show support for the disclosed functionality described herein within the client instance 42. Cloud provider infrastructures are generally configured to support a plurality of end-user devices, such as client device 14D, concurrently, wherein each end-user device is in communication with the single client instance 42. Also, cloud provider infrastructures may be configured to support any number of client instances, such as client instance 42, concurrently, with each of the instances in communication with one or more end-user devices. As mentioned above, an end-user may also interface with client instance 42 using an application that is executed within a web browser.

The present approach may rely on computational and communication architectures as described above to implement a prediction and action trigger technique as discussed herein. It should also be appreciated, however, that descriptions or discussion of particular architectures and frameworks is for the purpose of illustration only and to provide useful, concrete examples of possible implementations. Indeed, with respect to the techniques discussed herein, these techniques may be implemented in a multi-instance architecture as described herein, a multi-tenant architecture, a client-server or public network (i.e., Internet) context, or, in some instances, on a single computer or server suitably configured.

Figure 5:
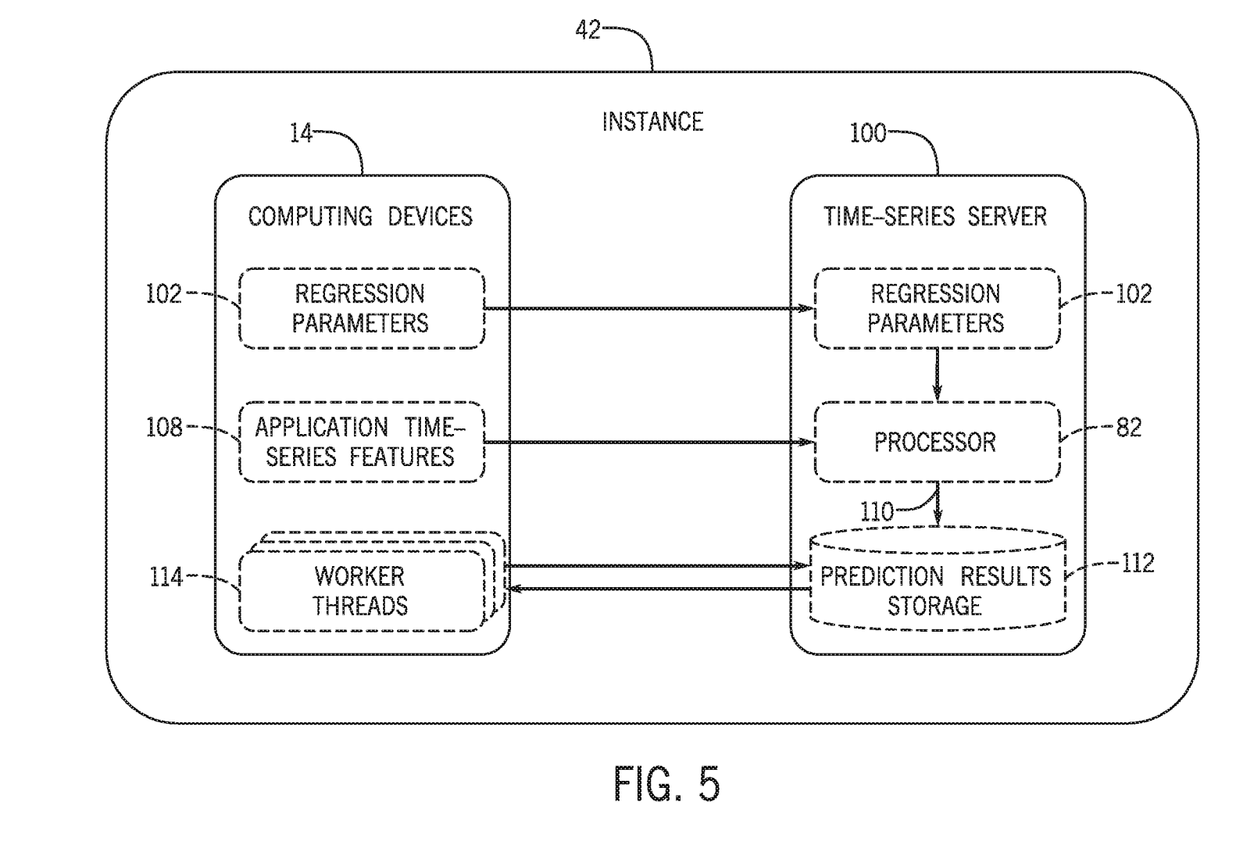
FIG. 5 depicts a generalized view of a client instance in communication with or facilitating communication between a computing device, such as on a client network, and a time-series server, such as may be present on a cloud platform of a service provider, in accordance with aspects of the present disclosure.

With this in mind, FIG. 5 depicts an example of a simplified architecture suitable for implementation of the present prediction modeling and action trigger approach. In this example, a client instance 42 as described above is depicted over which interactions between a computing device (e.g., client device 14) and a time-series server 100 occur. As may be appreciated, though such an instance mediated interaction is illustrated in order to provide a useful example in a cloud-based context, in practice the client device 14 and time-series server 100 may communicate via local network connections or other communication channels (e.g., non-cloud-based or client-server configurations). Indeed, in certain implementations, some or all of the functionality and operations attributed to the client device 14 and time-series server 100 may be performed on a single device or system, such as a local device or system on a local network.

With respect to the time-series server 100, such a server may be any physical or virtual device providing the functionality attributed to such a device herein, such as generating, updating, and applying a predictive model based on provided parameters and time-series data. In practice, such a time-series server 100 may be a virtual server 24 provided as part of a cloud-based platform with which the client device 14 interacts though, as noted above, it may take other forms, including a physical server or computing device provided on a local network.

In the cloud-based example depicted in FIG. 5, and as discussed in greater detail below, the client device 14 communicates via the instance 42 with the time-series server 100 to parameterize a predictive model, to communicate time-series data or observations, and to access prediction results for processing. Actions based on the prediction results are pre-configured by a user, such as via an interface provided on a computing device 14.

With this in mind, in the depicted example one or more regression parameters 102 (or other model parameters if the prediction model is not a regression model) are specified by a user at the computing device 14. For example, the user may interact with a graphical user interface (GUI) or other screen generated for display on the computer device over the instance 42 to specify or select model parameters, such as regression parameters 102. As will be appreciated, in other embodiments the parameters may be provided via any suitable screen or interface using the interface and communication configurations suitable for the respective architecture, without being limited to such an instance-based implementation.

In the depicted example, the regression parameters 102 are communicated to a time-series server 100, such as via an instance 42 in communication with the time-series server 102. As used herein, the time-series server may be a virtual server 24 or physical server on which time-series analysis routines are executed.

The regression parameters 102 (or other appropriate parameters) are provided or sent to a processor 82 associated with the time-series server 100. In addition, the processor 82 receives time-series data (e.g., application time-series features 108 in the example depicted in FIG. 5). The time-series data may be generated by a monitoring, logging, or other application running on the computing device 14 or a different computing device in communication with the instance 42. By way of example, time-series data provided to the time-series server 100 may include, but is not limited to, observations or metrics acquired periodically for an aspect of IT infrastructure, such as processor utilization, memory utilization, available bandwidth, free disk space, and so forth for one or more devices and/or networks.

In this example, the processor 82 executes routines for modeling a limited subset of the time-series data for a metric of interest to generate a predicted value 110 for the metric, which may be stored in a database or other storage construct or device 112. In one implementation, the processor 82 models the limited subset of time-series data for the metric of interest using a linear model, such as a linear regression technique. The time-series data used in the modeling process may be limited using a rolling window of the time-series data in which older data observations for the metric are removed as newer observations are added to the sample so as to maintain a substantially fixed number of observations or data points used in the modeling process. Such a rolling window may be based on a set number of most recent observations, on observations obtained over a specified time frame, or any other suitable updated data set implementation by which a limited number of observations is updated over time so as to incorporate newer observations and discard older observations.

As new observations or data points are acquired over time and the rolling window shifts, the model implemented using processor 82 may be updated, thereby generating a new prediction 110 for the metric, which is stored in the storage 112. Predictions 110 stored in this manner may in turn be accessed by one or more routines or threads 114 running on the computing device 14 or a different computing device in communication with the instance 42. For example, an executing thread 114 may correspond to an action to be taken in the event one or more prediction results 110 meet criteria specified by a user. Such actions may, by way of example, relate to generating a notification or alert, generating a log entry, updating a tracked status, initiating an incident, and so forth.

In this manner, time-series data for a metric of interest may be efficiently modeled to generate predictions for the metric, which may be indicative of a trend with respect to the time-series. These predictions for the metric in turn may be used to trigger an action based on one or more specified criteria with respect to the predicted values.

Figure 6:
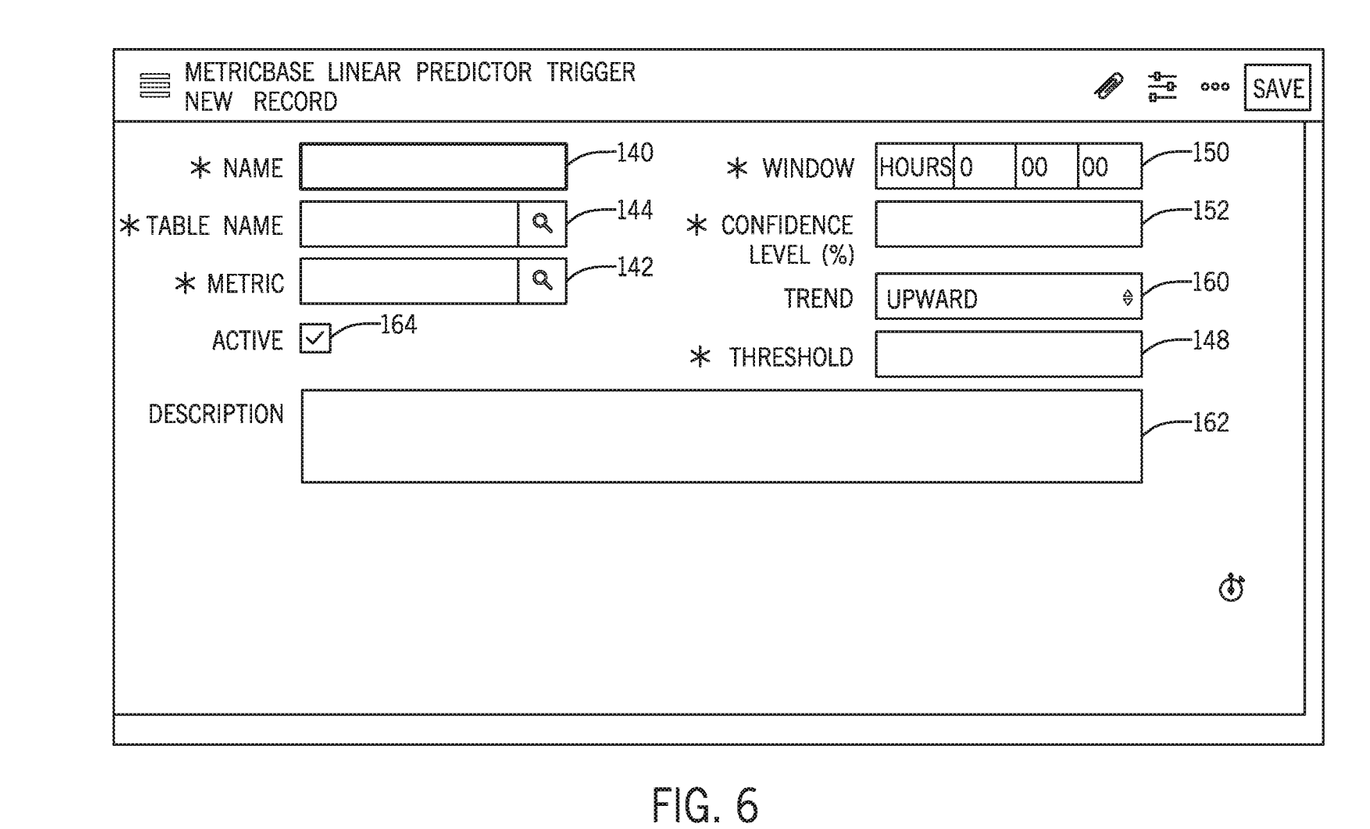
FIG. 6 depicts an example screen for configuring a prediction trigger, in accordance with aspects of the present disclosure.

Turning to FIG. 6, an example of a screen is depicted with which a user may interact to facilitate or implement certain aspects of the present approach. In this example, the screen may be displayed on a computing device 14 interacting with the instance 42 or capable of communicating with a time-series server 100.

Turning to FIG. 6, the depicted screen example illustrates a number of fields that may be configured by a user to define generation of predictions 110 for a metric of interest and to define a trigger associated with the metric. With this in mind, the example screen of FIG. 6 includes a "Name" field 140 by which a user may assign a name to the action trigger being configured (e.g., Processor Utilization (mail server), Available Memory (file server), Available Bandwidth (guest network), and so forth).

The user may also specify or select the metric to be monitored via a "Metric" field 142. As discussed herein, a suitable metric will be monitored or measured periodically so as to periodically generate or update a set of time-series data points. Data points for the metric may be stored in a table, which may be identified or specified in a corresponding "Table" field 144.

On the right-hand side of the example screen of FIG. 6, a variety of analytic parameters are illustrated. The depicted example illustrates an approach in which a temporal rolling window is employed to limit the number and/or recency of data points modeled so as to improve the efficiency of the process as well as to identify changes or trends more readily. With this in mind, a "Window" field 150 is provided in which a user may specify a time frame or interval (e.g., in months, weeks, days, hours, minutes, seconds, and so forth) defining the rolling data window. In this example, the most recent data points for the metric that fall within the time frame (e.g., data points generated within the last 24 hours, 12 hours, 20 minutes, and so forth) specified in the Window field 150 are fitted to a linear model, such as a linear regression, that generates a predicted value of the metric at a future time as an output. As noted herein, in other implementations the metric data may be limited in some other manner and/or the rolling window may be less directly tied to a temporal framework. For example, the rolling window may instead be defined as the most recent N data points or observations of the metric, without accounting for age of the data or with limited accounting for age, such as the most recent N data points excluding those data points older than 24 hours, one week, and so forth. Indeed, any approach to generating a rolling window of data points may be employed with the understanding that such a rolling window will limit the data points to be processed to either a fixed number (e.g., N) or to a maximum number (e.g., less than or equal to N) and will replace older data points with newer data points as the newer data points are generated such that the rolling window at a given time corresponds to the most recent data observations. In certain implementations discussed herein, the prediction model (e.g., linear regression model) is re-fit or tuned when the rolling window of data points is updated, such as when a new data point becomes available.

A "Threshold" field 148 may be provided to allow a user to specify a threshold value which when met or crossed by a predicted value of the metric (generated by the predictive model for a current rolling window of data points) causes a specified action to be performed (i.e., triggered). By way of example, for a metric related to processor utilization, a current window of processor utilization data points may be fitted to a linear regression model which may then be used to predict processor utilization in six hours. If, for a current rolling window of data points, the fitted model generates a predicted processor utilization in six hours exceeding the specified threshold, a specified action may be initiated, absent other considerations discussed below. In another example, the threshold may be viewed as a minimum as opposed to a maximum, such as available disk space, where a predicted value below the threshold may cause the specified action to be performed.

Another field depicted in the example of FIG. 6 is a "Confidence Level %" field 152. In practice, such a field may be used to allow a user to specify a degree or measure of certainty (e.g., 60%, 70%, 75%, 90%, and so forth) associated with the modeling of a current rolling window of data points using a linear model (e.g., a linear regression model). The confidence measure specified in field 152 may be used to determine if the prediction or estimate generated using the predictive model for a current rolling window of data points is usable to determine whether a configured action is triggered. That is, a current fitted model for which the measure of confidence is less than the specified confidence may be deemed unusable for determining whether or not to perform an action, even if the resulting predicted value would normally trigger such an action. Conversely, a fitted model for which the measure of confidence meets or exceeds the specified confidence may be deemed usable for determining whether or not to trigger the action. In certain implementations, the confidence may correspond to some statistical measure as to the fit of the predictive model (e.g., the linear regression) and/or the degree or extent to which the fitted model explains or accounts for the variance in the modeled data, with models accounting for less variance having corresponding lower confidence levels. In this manner, a user may specify that the action corresponding to the rule configured on the example screen will be performed only if the fit of the predictive model for a current rolling window of data points meets the specified confidence threshold, with values generated by a poorly fit model (i.e., having a confidence level below the specified threshold) being deemed too unreliable to cause a specified action to be performed.

Similarly, another factor that may be specified by the user on the example screen of FIG. 6 is the trend (i.e., "Trend" field 160) present in the rolling window of data points. In practice, the trend field may be used to allow a user to specify an expectation as to the trend to be observed in the time-series data points for the metric in question, such as an upward or downward trend line. For example, the trend with respect to available disk space over time may be expected to be downward. In one implementation, linear models fitted to the current rolling window of data points that do not exhibit the specified trend characteristics (e.g., slope) may be discarded or otherwise ignored for the purpose of triggering the specified action, regardless of whether the current value meets or crosses the specified threshold.

The example screen of FIG. 6 also includes a free-text field 162 that may be provided for a user to enter a "Description" of the trigger rule configured by the screen, such as a text-based description of the metric being monitored and the action to be triggered in the event of a model prediction meeting the specified threshold. In addition, a control box 164, here a check box, may be provided to allow a user to toggle the configured rule between active and inactive states.

With the preceding in mind, the actions triggered based on a rule configured as described above may take a variety of forms. By way of example, in response to an action being triggered in response to a prediction made with respect to a monitored metric, actions may be taken that include, but are not limited to: generating and/or sending a communication (e.g., e-mail, text message, in-application notification, and so forth) to a designated party conveying that the metric of interest is predicted to breach a threshold within a certain timeframe; generating a record or log entry in an application or system log; generating an incident report, opening a service request or ticket, and so forth. In this manner, a proactive response may be made in view of a predicted event that has been designated to be of interest or concern. Likewise, in certain implementations a corresponding action may also be taken in the event that the metric of interest is predicted to recover (i.e., after an initial threshold breach indication, a subsequent predicted value appears to be on the acceptable side of the threshold or the trend appears to be improving. As with the configuration of the trigger rules, the configuration of the responsive action (e.g., formatting a message, specifying an incident to be generated and so forth) may be performed on a user interface of a computing device in communication with the instance 42

With the preceding in mind, the present approach relates to techniques for efficiently monitoring time-series data for a metric of interest using limited subsets of the time-series data and, based on the modeling, to generate predictions for the metric. Based on the predictions for the metric, one or more actions may be configured to be taken when the predicted value for the metric is outside of a specified range or exceeds a specified threshold.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A time-series server, comprising:
   at least one memory configured to store instructions;
   at least one processor configured to execute the instructions stored in the memory to cause the time-series server to perform operations comprising:

communicating with a computing device associated with the time-series server to receive a time-series of data points for a metric monitored over time;

performing a regression on a rolling window of the time-series of data points to generate a predicted future value of the metric;

comparing the predicted future value of the metric to one or more predefined thresholds associated with the metric; and performing an action based on the predicted future value of the metric meeting or exceeding at least one of the one or more predefined thresholds.

2. The time-series server of claim 1, wherein the at least one processor is configured to execute the instructions to cause the time-series server to perform operations comprising:

generating an interface on the computing device, wherein the interface comprises one or more interaction points through which one or more regression parameters are selected or entered.

3. The time-series server of claim 1, wherein the at least one processor is configured to execute the instructions to cause the time-series server to perform operations comprising:

communicating with a second computing device associated with the time-series server to receive one or more regression parameters before performing the regression.

4. The time-series server of claim 1, wherein performing the regression on the rolling window of the time-series of data points comprises performing a linear regression on the rolling window of the time-series of data points.

5. The time-series server of claim 1, wherein the rolling window of the time-series of data points and the predicted future value of the metric are updated in response to a new observation being made of the metric.

6. The time-series server of claim 1, wherein, to compare the predicted future value of the metric to one or more predefined thresholds associated with the metric, the at least one processor is configured to execute the instructions to cause the time-series server to perform actions operations comprising:

providing the predicted future value of the metric to a communicatively coupled computing device, wherein the computing device is configured to compare the predicted future value of the metric to the one or more predefined thresholds associated with the metric.

7. The time-series server of claim 6, wherein the computing device is configured to perform the action in response to the computing device determining that predicted future value of the metric meeting or exceeding at least one of the one or more predefined thresholds.

8. The time-series server of claim 1, wherein the at least one processor is configured to execute the instructions to cause the time-series server to perform operations comprising:

comparing a confidence level associated with the predicted future value of the metric to a threshold confidence level; and in response to the confidence level associated with the predicted future value of the metric being below the threshold confidence level, discarding the predicted future value of the metric from further consideration.

9. The time-series server of claim 1, wherein the at least one processor is configured to execute the instructions to cause the time-series server to perform operations comprising:

determining a trend direction associated with the predicted future value of the metric;

comparing the trend direction to an expected trend direction for the time-series of data; and in response to the trend direction associated with the predicted future value of the metric differing from the expected trend direction, discarding the predicted future value of the metric from further consideration.

10. The time-series server of claim 1, wherein the rolling window of the time-series of data points comprises a limited number of observations of the metric that is updated over time to incorporate newer observations and discard older observations.

11. A method for triggering an automated action, comprising:

automatically accessing a time-series of data points for a metric monitored over time;

determining a rolling window of the time-series of data points for the metric, wherein the rolling window is updated when a new data point is added to the time-series;

using a processor of a time-series server, performing a linear regression on the rolling window to generate a respective predicted future value of the metric for each update of the rolling window;

comparing each respective predicted future value of the metric to one or more respective thresholds; and performing an action in response to the one or more respective thresholds being met or breached by each respective predicted future value of the metric.

12. The method of claim 11, wherein automatically accessing the time-series of data points comprises continuously accessing the time-series of data points.

13. The method of claim 11, further comprising parameterizing the linear regression using one or more regression parameters received from a processor of a communicatively coupled computing device.

14. The method of claim 11, further comprising:

comparing a respective confidence level associated with each respective predicted future value of the metric to a respective threshold confidence level; and in response to the respective confidence level associated with each respective predicted future value of the metric being below the respective threshold confidence level, discarding the respective predicted future value of the metric from further consideration.

15. The method of claim 11, further comprising:

determining a respective trend direction associated with each respective predicted future value of the metric;

comparing each respective trend direction to a respective expected trend direction for the time-series of data; and in response to the respective trend direction associated with each respective predicted future value of the metric differing from the respective expected trend direction, discarding the respective predicted future value of the metric from further consideration.

16. The method of claim 11, wherein the rolling window of the time-series of data points comprises a limited number of observations of the metric that are updated over time to incorporate newer observations and discard older observations.

17. A non-transitory, computer-readable medium storing instructions executable by a processor of a computing system to trigger actions based on monitored time-series data, the instructions comprising:

instructions to access a time-series of data points for a metric monitored over time;

instructions to update a rolling window of the time-series of data points for the metric when a new data point is added to the time-series;

instructions to perform a linear regression on the rolling window to generate a predicted future value of the metric for the update of the rolling window; and instructions to perform an action in response to a threshold being met or breached by the predicted future value of the metric.

18. The computer-readable medium of claim 17, wherein the instructions comprise:

instructions to compare a confidence level associated with the predicted future value of the metric to a threshold confidence level; and instructions to discard the predicted future value of the metric from further consideration in response to the confidence level associated with the predicted future value of the metric being below the threshold confidence level.

19. The computer-readable medium of claim 17, wherein the instructions comprise:

instructions to determine a trend direction associated with the predicted future value of the metric;

instructions to compare the trend direction to an expected trend direction for the time-series of data; and instructions to discard the predicted future value of the metric from further consideration in response to the trend direction associated with the predicted future value of the metric differing from the expected trend direction.

20. The computer-readable medium of claim 17, wherein the instructions comprise:

instructions to generate a graphical user interface (GUI), wherein the GUI comprises one or more interaction points through which one or more regression parameters are selected or entered.

* * * * *